3,223,689
COPOLYMERS OF FLUORINATED UNSATURATED HYDROCARBONS WITH NON-FLUORINATED NITROSO COMPOUNDS AND METHOD OF PREPARING SAME
Robert Neville Haszeldine, Windyridge, Lyme Road, Disley, England; Ronald Eric Banks, 187 Kingsway, Manchester, England; and Michael King McCreath, 7 Rutland Road, Harrogate, England
No Drawing. Filed Feb. 27, 1962, Ser. No. 176,090
Claims priority, application Great Britain, Mar. 17, 1961, 9,875/61
9 Claims. (Cl. 260—92.1)

This invention relates to polymers of nitroso compounds.

Copolymers of certain fluorinated nitroso compounds with fluoroalkenes have already been proposed. For example, in the specification of British Patent No. 843,795 there are described and claimed copolymers having a repeating unit of the formula:

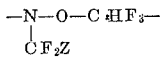

where Z is a univalent radical, and a method of preparing such polymers by reacting trifluoroethylene with a fluorinated nitrosoalkane of formula $ZCF_2NO$.

The present invention provides copolymers of a fluorinated, olefinically unsaturated hydrocarbon, which may contain substituents in addition to the fluorine atoms, with a non-fluorinated nitroso compound. The nitroso compound is preferably a secondary or tertiary compound. Thus it preferably has three carbon atoms, or two carbon atoms and a chlorine atom, attached to the carbon atom adjacent to the nitro group and is free from fluorine atoms. Polymers of non-fluorinated nitroso compounds have not been prepared previously.

The polymers provided by the invention have one unit of fluorinated, olefinically unsaturated hydrocarbon to one unit of nitroso compound, but it is of course contemplated that terpolymers, tetrapolymers, etc. having more than one type of olefinically unsaturated hydrocarbon residue or more than one type of nitroso compound residue can be prepared by using mixtures of different fluorinated olefinically unsaturated hydrocarbons with nitroso compounds.

An advantage of the polymers of the present invention over known fluorinated nitroso polymers lies in their cheapness. The nitroso compounds used in their preparation are inexpensive and easily prepared, in contrast to the fluorinated nitroso compounds used in the prior polymers. At the same time the presence of fluorinated groups derived from the olefinically unsaturated hydrocarbon makes the novel polymers more inert chemically, and hence more resistant to chemical or thermal attack, than non-fluorinated polymers. There are very few compounds which will copolymerize, in a 1:1 or near 1:1 ratio, with fluorinated olefinically unsaturated hydrocarbons such as tetrafluoroethylene, $CF_3 \cdot CF=CF_2$ or, $CF_2=CFCl$. Those that do so copolymerize have hitherto always contained fluorine, and have almost always been other fluoro-olefins. It is thus important that a new class of compound, containing no fluorine at all, has been found capable of undergoing 1:1 copolymerization with industrially important olefins such as $C_2F_4$, $C_3F_6$, etc. This class of compound, the non-fluorinated nitroso compounds defined above, is unique amongst those compounds which give 1:1 copolymers with $C_2F_4$ in several respects: (a) the copolymerization is easily carried out under very mild reaction conditions, (b) it has a double bond between N and O instead of between C and C, (c) it is free from fluorine and hence easily and cheaply made, (d) it adds useful solubilising characteristics to the resultant copolymer, making it of value for surface coatings etc.; and (e) it differs from the nitroso compounds containing fluorine by often existing as a dimer rather than as a monomer and being much less stable thermally in the uncopolymerized state.

The novel copolymers may be formed by simply bringing the reactants together under suitable conditions. In many cases the reaction will occur spontaneously at room temperature or even lower, and at atmospheric pressure.

If desired, an initiating agency capable of giving rise to free radicals may be employed. This may be a chemical initiator such as a peroxide or an azo compound, e.g. benzoyl peroxide or $\alpha$, $\alpha'$-azodiisobutyronitrile; or it may be radiation, such as ultra violet, infra-red, X, gamma or high energy electron radiation. Chemical initiators sometimes have the disadvantage that they are difficult to remove from the product. On the other hand, in some cases radiation tends to decompose the nitroso reactant. Thus the compound 2-chloro-2-nitrosopropane is preferably reacted in the dark.

In general, the reaction can be carried out at temperatures ranging from about $-50°$ C. to about $150°$ C. and absolute pressures of from about 1 to about 300 atmospheres. Pressures of 1 to 50 atmospheres are usually adequate. A time of from say 30 minutes to 48 hours should in general be allowed to effect the reaction, the time being dependent on other conditions, particularly pressure.

The use of large surfaces, such as that furnished by glass wool, is useful in facilitating the copolymerization reaction.

The molar ratio of fluorinated olefinically unsaturated hydrocarbon to nitroso compound is open to considerable variation and may range from say 1:5 to 10:1. Usually approximately equimolar proportions are employed.

The reaction may be carried out in the absence of a solvent or in the presence of an inert solvent.

In general, the nitroso compounds suitable for use in the invention have the general formula $RR°R'C.NO$, where R is a chlorine atom, an alkyl group having not more than 20 carbon atoms, an aryl group, or a cycloalkyl group having not more than 6 cyclic carbon atoms. These groups may or may not contain non-interfering substituents, such as halogens other than fluorine, for example, chlorine and bromine. Each of $R°$ and $R'$ is an alkyl, aryl, or cycloalkyl group of the types identified in connection with R. Exemplary of such nitroso compounds are 2-chloro-2-nitroso-propane and nitroso-t-butane.

The fluorinated olefinically unsaturated hydrocarbon may be, for example, a diene or mono-olefin, and among suitable compounds are fluoroalkenes of the general formula $R''R'''C=CF_2$ where $R''$ is a fluorine, chlorine or hydrogen atom, or an alkyl group, having from say 1 to 10 carbon atoms, and which may or may not contain fluorine and/or chlorine substituents; and where $R'''$ is a fluorine, chlorine or hydrogen atom, or an alkyl or alkenyl group having from say 1 to 10 carbon atoms, and which may or may not contain fluorine and/or bromine substituents. Also suitable are compounds of the general formula $CF_3(CF_2)_nCF:CF_2$, where $n$ is not greater than 20. Typical compounds are tetrafluoroethylene, 1,2-dichlorodifluoroethylene, chlorotrifluoroethylene, perfluorobutadiene, $CF_2=CH \cdot CF=CF_2$, $$CF_2=CH \cdot CH=CF_2,$$
$$CF_2=CCl \cdot CF=CF_2$$

and $$CF_2=C(CF_3)-CF=CF_2$$

As evidenced by the specific structural formulas given in

Examples 1 and 4 below, the polymers provided by the invention comprise repeating units of the structure

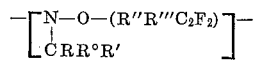

They may take the form of liquids—mobile or viscous, greases, or solids, including elastomers, the precise form depending on the reactants and the reaction conditions. Normally the molecular weight can range from say 1000 to 2,000,000. Since hydrocarbon groups are present in the polymer, the polymers are more soluble in conventional organic solvents than are completely fluorinated polymers and form dispersions more readily than completely fluorinated polymers. Consequently the novel polymers can be used for surface coatings such as paints, and to form films. They may also be used as chemical-resistant oils, greases and waxes, or (when appropriate), in applications requiring elastomeric solids.

The polymers may be cross-linked to form insoluble products. Cross-linking may be effected by reaction with polyfunctional compounds such as diamines or diols; or by free radical methods involving the abstraction of a hydrogen atom from the polymer molecule, followed by dimerization. The latter type reaction is facilitated by use of an initiating agency, e.g. a chemical initiator of the peroxide or azo type, high energy electron radiation, or X, gamma, ultraviolet or infra-red radiation, in order to remove a hydrogen atom by free-radical attack.

The invention will now be illustrated with reference to the following examples and experimental data.

It should be noted that tertiary non-fluorinated nitroso compounds usually exist as dimers exhibiting cistrans isomerism, the dimer being dissociated in solution or above its melting point. When the compound has a highly electronegative atom or group alpha to the nitroso group, it usually exists only as the monomer. 2-chloro-2-nitrosopropane is such a compound.

Nitroso-t-butane, which may be prepared according to the procedure described by Emmons in J.A.C.S., 1957, 79, 6522, exists as a white, crystalline dimer at room temperature. When it is heated above its melting point (70–71°) it dissociates into the blue vapor of the monomer:

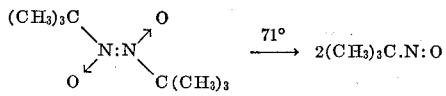

Solutions of the dimer in solvents such as hydrocarbons, ethers, alcohols, etc. are deep blue in color, which indicates that dissociation of the dimer has taken place. The following reactions were, therefore, carried out either at 80° or in 1,1,2-trichlorotrifluoroethane (an inert solvent) under which conditions the nitroso-t-butane was present as the monomer $(CH_3)_3C.N{:}O$.

EXAMPLE 1

*The reaction of nitroso-t-butane and tetrafluoroethylene at an elevated temperature*

3.5 g. (0.036 mole) of nitroso-t-butane are treated with 3.68 g. (0.37 mole) of tetrafluoroethylene at 80° C. After 5 hours, when disappearance of the blue color of the nitroso compound indicates that complete reaction has taken place, the reaction products are analysed. There is produced 3.40 g. of a light-brown resin and 1.25 g. of an unidentified fraction containing three components, together with trans-2-butene and isobutene. 33.7% of the tetrafluoroethylene is recovered unchanged, and 38.2% of nitrous oxide, based on the nitroso-t-butane, is formed.

The light brown resin is separated by extraction with petroleum-ether (0–40°) into a brown, fluorine-free gum (78% by wt. of total polymer) and a pale-yellow resin (the soluble component). The resin has the correct elemental analysis for a 1:1 copolymer of nitroso-t-butane and tetrafluoroethylene:

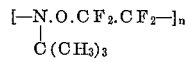

This structure is supported by infra-red analysis. The molecular weight is of the order of 10,000 to 50,000.

The brown polymer, which is insoluble in the petroleum ether, arises from the decomposition of the nitroso-t-butane. This is confirmed by a blank experiment carried out in the absence of tetrafluoroethylene. 0.6 g. of nitroso-t-butane is heated at 80° in a sealed glass tube for six days before any sign of decomposition is noted. Further heating during four weeks completely destroys the nitroso compound, the main product being a brown gum accompanied by small amounts of nitrogen, nitrous oxide, and isobutene.

EXAMPLE 2

*The reaction of nitroso-t-butane and tetrafluoroethylene in a solvent*

In order to reduce the amount of decomposition of the nitroso-compound and so improve the yield of a 1:1 copolymer, a copolymerisation reaction is carried out at 20° C. in 1,1,2-trichlorotrifluoroethane, using 4.35 g. (0.05 mole) of nitroso-t-butane and 5.0 (0.05 mole) of tetrafluoroethylene. After four weeks, 6.5 g. of a pale yellow resin, identical with the 1:1 polymer prepared at 80°, are isolated, representing an 87% yield. This is accompanied by small amounts of nitrous oxide, isobutene and trans-2-butene. 21.5% of the tetrafluoroethylene is recovered.

EXAMPLE 3

0.87 g. (0.01 mole) of nitroso-t-butane is reacted with 1.0 g. (0.01 mole) of tetrafluoroethylene at 0° C. in solution in 1,1,2-trichlorotrifluoroethane. After 12 weeks the blue color of the nitroso-t-butane has disappeared and 1.0 g. of a pale-yellow resin, identical with the 1:1 polymer obtained in Examples 1 and 2, is isolated. This represents a yield of 68%. Small amounts of nitrous oxide, isobutene, and trans-2-butene are also produced.

The reactions of 2-chloro-2-nitrosopropane with tetrafluoroethylene are illustrated by Examples 4–6 below. Since 2-chloro-2-nitrosopropane is decomposed by sunlight, the reactions of Examples 4 and 5 are carried out in the dark in sealed, evacuated glass tubes.

EXAMPLE 4

13.6 g. (0.127 mole) of 2-chloro-2-nitrosopropane are reacted with 13.2 g. (0.132 mole) of tetrafluoroethylene at 20° C. 77% of the tetrafluoroethylene is recovered unchanged, together with 10 g. of a brown gum. This gum contains a 1:1 copolymer of the reactants, presumably having the characteristic repeating unit:

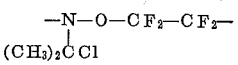

The gum is soluble in polar solvents such as acetone, methanol and ethanol, and insoluble in non-polar solvents such as benzene and the petroleum ethers. Other products of the reaction are hydrogen chloride and 2,2-dichloropropane, together with smaller amounts of acetone and isopropenyl chloride and a trace of sodium fluoride formed in a side reaction with the glass of the apparatus.

EXAMPLE 5

12.5 g. (0.116 mole) of 2-chloro-2-nitrosopropane are reacted with 16.0 g. (0.160 mole) of tetrafluoroethylene at 0° C. Again, 77% of tetrafluoroethylene is recovered unchanged together with 10.1 g. of a brown gum identical with that obtained in Example 4. The byproducts are again hydrogen chloride, 2,2-dichloropropane, acetone, isopropenyl chloride, and sodium fluoride, the amounts of the first two being rather less and of the last three being rather more than in Example 4.

EXAMPLE 6

The reaction between 2-chloro-2-nitrosopropane and tetrafluoroethylene at 20° is repeated using an autoclave as the reaction vessel to ensure the complete absence of light, and to preclude side reactions with glass which led to the formation of sodium fluoride in the previous examples. However, after a two-week reaction period, the main product is a brown gum identical with that produced in the reactions carried out in Examples 4 and 5. Over 80% of the tetrafluoroethylene is recovered unchanged.

What is claimed is:

1. Copolymers of nitroso compounds having the formula $$RR°R'CNO$$

where R is selected from the group consisting of chlorine and alkyl groups having not more than 20 carbon atoms and R° and R' are alkyl groups having not more than 20 carbon atoms, and a fluoroalkene having the general formula $$R''R'''C=CF_2$$

where R'' is selected from the group consisting of fluorine, chlorine, hydrogen, and alkyl, fluoroalkyl, chloroalkyl and fluorochloroalkyl groups having from one to 10 carbon atoms and R''' is selected from the group consisting of fluorine, chlorine, hydrogen, and alkyl, alkenyl, fluoroalkyl, fluoroalkenyl, chloroalkyl, chloroalkenyl, fluorochloroalkyl and fluorochloroalkenyl groups having from 1 to 10 carbon atoms; provided that when R'' is fluorine, R''' may be a $CF_3(CF_2)_n$-group where $n$ is an integer not greater than 20 said copolymer having a molecular weight of at least 1,000.

2. Copolymers of tetrafluoroethylene with nitroso-t-butane, having a molecular weight of at least 1,000.

3. Copolymers of tetrafluoroethylene with 2-chloro-2-nitrosopropane, having a molecular weight of at least 1,000.

4. Polymeric compounds having a molecular weight of at least 1,000 and consisting essentially of a chain of repeating units having the general formula $$-[N-O-(R''R'''C_2F_2)]-$$
$$\quad\;\;|$$
$$\;\;CRR°R'$$

where R is selected from the group consisting of chlorine, alkyl, aryl, and cycloalkyl groups, and alkyl, aryl, and cycloalkyl groups substituted by non-interfering substituents, R° and R' are selected from the group consisting of alkyl, aryl and cycloalkyl groups, and alkyl, aryl and cycloalkyl groups substituted by non-interfering substituents, R'' is selected from the group consisting of fluorine, chlorine, hydrogen, and alkyl, fluoroalkyl, chloroalkyl and fluorochloroalkyl groups having from one to 10 carbon atoms and R''' is selected from the group consisting of fluorine, chlorine, hydrogen, and alkyl, alkenyl, fluoroalkyl, fluoroalkenyl, chloroalkyl, chloroalkenyl, fluorochloroalkyl and fluorochloroalkenyl groups having from 1 to 10 carbon atoms; provided that when R'' is fluorine, R''' may be a $CF_3(CF_2)_n$-group where $n$ is an integer not greater than 20.

5. Polymeric compounds having a molecular weight of at least 1,000 and consisting essentially of a chain of repeating units having the general formula $$-\begin{bmatrix} N-O-CF_2-CF_2 \\ | \\ C(CH_3)_3 \end{bmatrix}-$$

6. Polymeric compounds having a molecular weight of at least 1,000 and consisting essentially of a chain of repeating units having the general formula $$-[N-O-CF_2-CF_2]-$$
$$\;\;|$$
$$(CH_3)_2C-Cl$$

7. A method of making polymers containing fluorine and nitrogen which comprises copolymerizing a nitroso compound having the formula $$RR°R'CNO$$

where R is selected from the group consisting of chlorine and alkyl groups having not more than 20 carbon atoms and R° and R' are alkyl groups having not more than 20 carbon atoms, with a fluoroalkene having the general formula $$R''R'''C=CF_2$$

where R'' is selected from the group consisting of fluorine, chlorine, hydrogen, and alkyl, fluoroalkyl, chloroalkyl and fluorochloroalkyl groups having from one to 10 carbon atoms and R''' is selected from the group consisting of fluorine, chlorine, hydrogen, and alkyl, alkenyl, fluoroalkyl, fluoroalkenyl, chloroalkyl, chloroalkenyl, fluorochloroalkyl and fluorochloroalkenyl groups from 1 to 10 carbon atoms; provided that when R'' is fluorine, R''' may be a $CF_3(CR_2)_n-$ group where $n$ is an integer not greater than 20, at a temperature of between about $-50°$ C. and about 150° C. and at an absolute pressure of between about 1 and about 300 atmospheres.

8. A method for forming polymeric compounds which comprises copolymerizing tetrafluoroethylene with nitroso tertiary butane, at a temperature of between about $-50°$ C. and about 150° C. and at an absolute pressure of between about 1 and about 300 atmospheres.

9. A method for forming polymeric compounds which comprises copolymerizing tetrafluoroethylene with 2-chloro-2-nitrosopropane, at a temperature of between about $-50°$ C. and about 150° C. and at an absolute pressure of between about 1 and about 300 atmospheres.

References Cited by the Examiner

UNITED STATES PATENTS

| | | | |
|---|---|---|---|
| 3,058,961 | 10/1962 | Haszeldine | 260—87.5 |
| 3,072,592 | 1/1962 | Crawford | 260—87.5 |

FOREIGN PATENTS 843,795  8/1960  Great Britain.

JOSEPH L. SCHOFER, *Primary Examiner.*

J. R. LIBERMAN, WILLIAM H. SHORT, *Examiners.*